United States Patent [19]

Doyle

[11] Patent Number: 4,805,043

[45] Date of Patent: Feb. 14, 1989

[54] MICROGAP RECORDING USING FERRIMAGNETIC MEDIUM FOR MAGNETO-OPTIC PLAYBACK

[75] Inventor: William D. Doyle, San Diego, Calif.

[73] Assignee: Eastman Kodak Company, Rochester, N.Y.

[21] Appl. No.: 138,787

[22] Filed: Dec. 28, 1987

[51] Int. Cl.⁴ .............................................. G11B 5/02
[52] U.S. Cl. ...................................... 360/59; 360/114
[58] Field of Search .................................. 360/59, 114

[56] References Cited

U.S. PATENT DOCUMENTS

| | | | |
|---|---|---|---|
| 3,731,290 | 5/1973 | Aagard | 360/114 |
| 4,302,790 | 11/1981 | Lemke | 360/119 |
| 4,340,914 | 7/1982 | Hanaoka | 360/59 |
| 4,520,409 | 5/1985 | Kimoto et al. | 360/59 |
| 4,588,995 | 5/1986 | Nishimura et al. | 360/59 |
| 4,599,658 | 7/1986 | Saitoh et al. | 360/59 |

*Primary Examiner*—Vincent P. Channey
*Assistant Examiner*—Surinder Sachar
*Attorney, Agent, or Firm*—Daniel Robbins

[57] ABSTRACT

A ferrimagnetic medium is locally heated above its compensation temperature and a magnetic record head provides a magnetic field for data recording on the heated portion of the medium. Upon re-cooling to the compensation temperature, the recorded signal is magnetically "locked" in the medium. The user of a magnetic head to provide the recording magnetic field allows fast head current switching rates with attendant high density data recording or high speed erasure of the medium. The recorded medium is read by means of conventional magneto-optic apparatus.

3 Claims, 4 Drawing Sheets

MICROGAP RECORDING USING FERRIMAGNETIC MEDIUM FOR MAGNETO-OPTIC PLAYBACK

BACKGROUND OF THE INVENTION

1. Field of the Invention

This invention relates to recording and erasure of digital data for playback by magneto-optic means, and in particular to recording and erasure of high density digital data at high data rates.

2. Description Relative to the Prior Art

Figure 1:
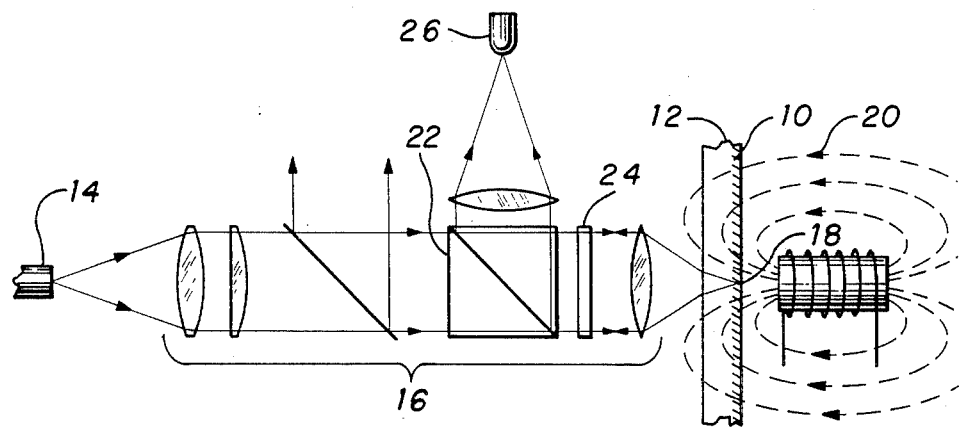
Figure 2:
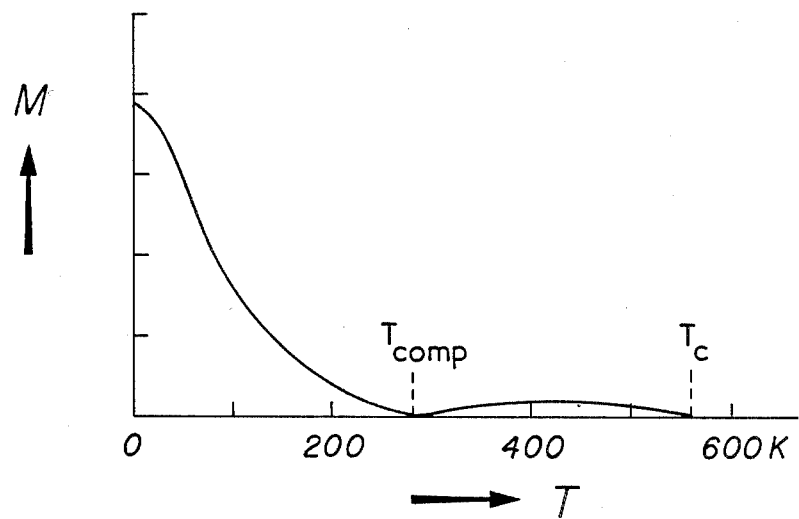
Figure 3:
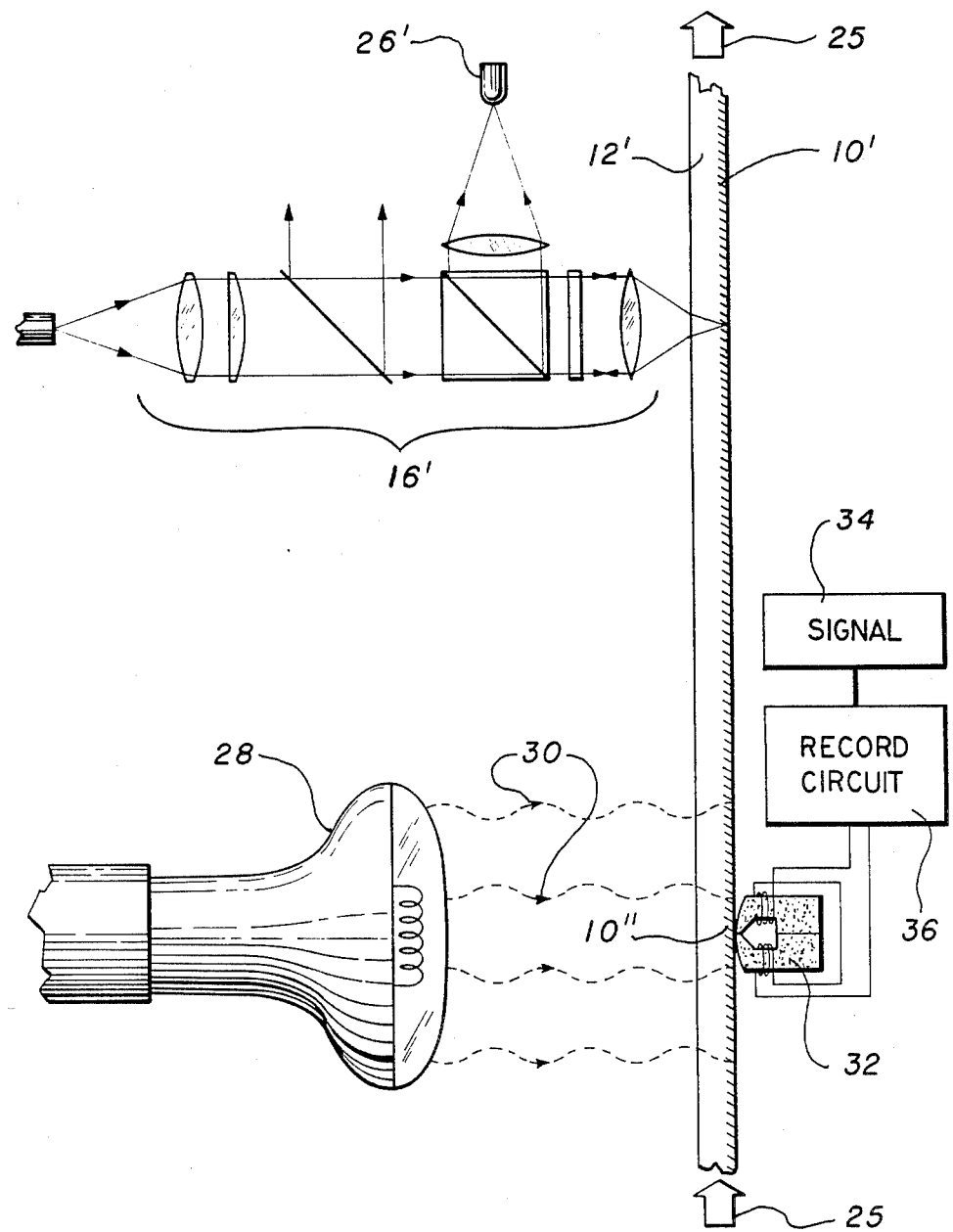
Figure 4:
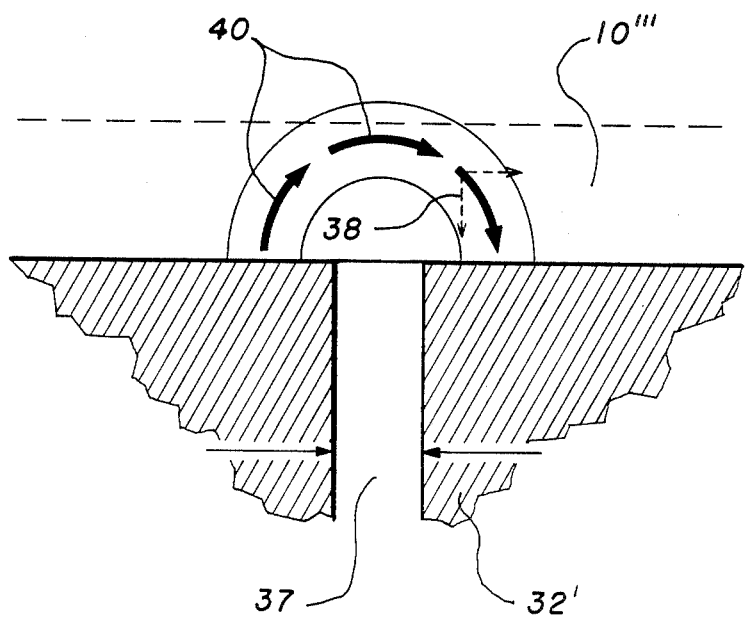
Figure 5:
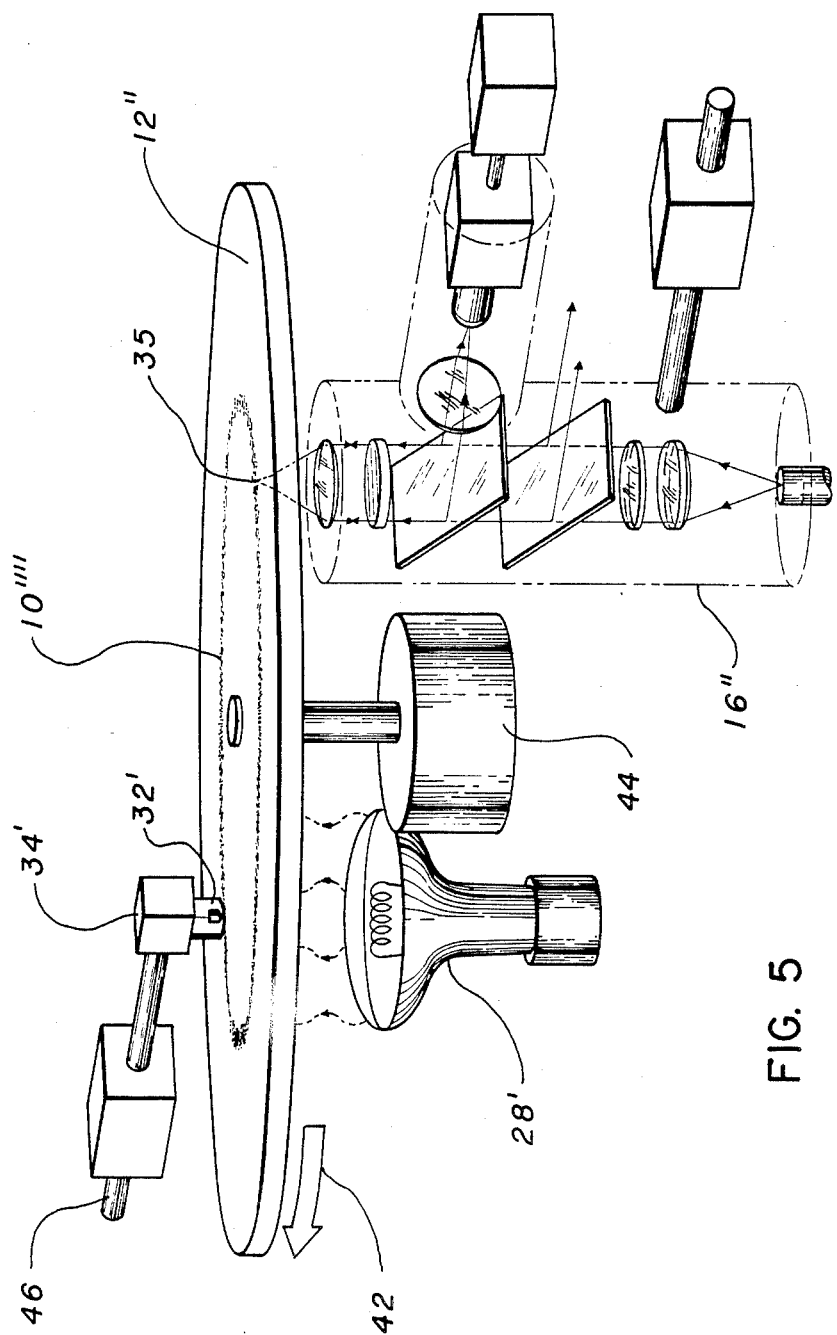

The invention, as well as the prior art, will be described with reference to the figures, of which:

FIG. 1 illustrates an example of magneto-optic recording and playback apparatus known in the prior art, FIG. 2 is a plot of the magnetization as a function of temperature of a ferrimagnetic substance known in the prior art, FIG. 3 depicts recording information in accordance with the teaching of the invention and playback of the information by magneto-optic means, FIG. 4 illustrates the recording zone of a magnetic recording head known in the prior art, and FIG. 5 depicts an apparatus incorporating recording of information according to the teaching of the invention, for playback by magneto-optic means.

The storage and recovery of digital data by use of magnetooptic techniques are well known in the art. Referring to FIG. 1, data is recorded on a ferrimagnetic thin film storage medium 10 deposited on one surface of a transparent substrate 12. The ferrimagnetic storage medium 10 is capable of sustaining magnetization in a direction normal to the plane of the medium 10. The thin film storage medium 10 is initially uniformly magnetized in a direction which may be designated as "up" for, say, a "0" signal. Recording is effected by means of a laser 14 whose beam traverses an optical system 16 which focusses the laser 14 energy onto a sharp spot 18 of the the ferrimagnetic storage surface 10 while the surface is simultaneously subjected to a magnetic field 20 opposite in direction to the medium's initial magnetization. That is, the external magnetic field 20 is in the "down" direction or in the direction of magnetization for a recorded "1". The incident laser 14 beam energy raises the temperature at the focussed spot 18 of the medium 10 which results in switching the storage medium's 10 magnetization from "up" to "down" under the influence of the external field 20 changing the stored information value from "0" to "1".

Playback is accomplished at a lower energy level of the laser 14. A polarizing beam splitter 22 transmits the parallel polarization component of the laser beam through a Faraday rotator 24 and the beam is then focussed onto the information spot 18 of the storage medium 10. The plane of polarization of the incident radiation is rotated upon reflection from the spot 18 depending upon the direction of magnetization of the spot 18. The reflected beam is further rotated by the Faraday rotator 24 before it impinges on the polarizing beam splitter 22 where the reflected beam is transmitted to a detector 26 which measures the amplitude of the reflected beam. The amplitude of the beam at the detector 26 varies between two values depending upon the direction of magnetization of the spot 18 allowing the determination of either a recorded "0" or "1".

Two modes of magneto-optic recording have been practiced in the prior art. One, known as "Curie point" recording, raises the medium's temperature to above its Curie point, ( Tc as shown in FIG. 2), by means of the laser beam to effect switching of the magnetization by the external field upon subsequent cooling below the Curie point. The second is known as "compensation point" recording which may also be understood by referring to FIG. 2. The curve of FIG. 2 shows the variation of the magnetization, M, of a typical ferrimagnetic storage media, e.g., thin film alloys of gadolimium, iron and terbium, as a function of the absolute temperature, T. At a temperature approximately in the vicinity of room temperature, it will be seen that the effective magnetization M goes to O; this temperature, Tcomp, is the "compensation temperature". At temperatures greater than Tcomp the effective magnetization M again rises, and then falls as the medium's temperature approaches the Curie temperature, Tc. It is known in the art that at Tcomp it is effectively impossible to change the direction of the effective magnetization of the medium—its magnetic state is fixed, independent of applied field. An equivalent statement is the coercivity of the medium approaches infinity at the compensation temperature. This occurs because at Tcomp the opposing magnetic moments of the constituent sub-latices of the ferrimagnetic material cancel each other, and there is not resultant moment to be switched by an external field. To effect recording, therefore, it is necessary to shift the medium's temperature away from Tcomp. In compensation point recording, the incident energy from the laser beam raises the temerature at the focussed spot above Tcomp, e.g, to, say, 400 degrees Kelvin, where the medium is again capable of sustaining effective magnetization—the opposing magnetic moments of the constituent sub-lattices no longer being equal, the external field switches the direction of magnetization at the heated spot. When the laser beam is moved from the recorded spot, the medium cools to room temperature, i.e. to approximately Tcomp, and the new direction of magnetization is "frozen" in place as a recorded "1". It will be appreciated that the medium will sustain very short wavelength recording due to the extremely high coercivity of the medium in the region the compensation temperature.

In the erasure of recorded data in the prior art it is necessary to selectively restore the magnetization of the information spot being erased to the original magnetization direction of the medium. This requires raising the temperature of the information sopt by means of the laser beam, and reversing the direction of the external magnetic field by reversing the current in a coil which generates the field. Because the magnetic field exists throughout a considerable volume of space, (it "floods" the medium rather than being focussed on the medium), field reversal requires reversal of the current flowing through a winding having an appreciable inductance. This requires a relatively long time to accomplish because of the substantial time constant of the coil circuit, and the rate of erasure and hence the rate of re-recording data is attendantly limited. In practice, erasure in the prior art is generally restricted to rates no greater than 200 kilohertz.

The present invention utilizes compensation point recording, but employs it in a recording technique that is not subject to the above described limitation on erasure and rerecording rates. By following the teaching of the invention, erasure and re-recording of data for magneto-optic playback may be performed at very high rates.

SUMMARY OF THE INVENTION

Rather thanflooding the recording medium ith a widely dispersed magnetic field and effecting recording by raising the temperature above the compensation temperature at a sharply focussed point by means of a laser, the present invention teaches flooding the recording medium with, say, radiant energy to raise the temperature of the medium above the compensation temperature and thenrecording signals at high recording densities by means of a magnetic head. While conventional recording heads may be used in the practice of the invention, a "microgap recording head", as described in U.S. Pat. No. 4,302,790, entitled "Magnetic Recording Head with Effective Magnetic Gap Length Less Than About 15 Microinches", issued in the name of James U. Lemke, is particularly suitable for use in the practice of the present invention since it allows very high density recording at very high data rates. It will be apreciated that by the use of such a magnetic head, unlike the prior art, high speed recording may be effected without the requirement of pre-magnetizing the medium. Because the field of he magnetic head can be switched to either direction at high rates, any preselectetd point of the medium can be magnetized in a given direction. Consequently, selective erasure may also be performed at high rates, since unlike the practice of the prior art, the magnetic field may be selectively switched at the point of the medium requiring erasure in an extremely short time interval.

Referring to FIG. 3, a ferrimagnetic medium 10' deposited on a suitable substate 12' moves in the direction indicated by the arrow 25. (In the drawings, different but related elements are identified with the same reference character, albeit that one element's reference character may be unprimed while that of its related element is primed.) A source 28 provides radiant energy which is incident on the substrate 12' and medium 10', raising the temperature of the irradiated portion of the medium 10'' above the compensation temperature of the medium. Under these conditions the meduim 10'' will support magnetization and a magnetic head 32 driven by a record circuit 36 and associated signal source 34 generates a magnetic field which is applied to the localized heated portion of the medium 10'' switching the direction of the magnetization of the medium 10''. As the medium 10'' moves out of the radiant energy field 30, it ools back down to the compensation temperature, locking in the recorded signal. The recorded portion of the moving medium 10' then approaches a conventional low level laser magnetoptic reader 16', and the recorded signal is recovered at detector 26' in the manner known in the prior art as previously described.

As previously stated, the ferrimagnetic medium supports perpendicular magnetization. Referring to FIG. 4, a magnified portion of the head 32' gap region 37 is shown in contact with the heated recording medium 10'''. The recording field, represented by the vectors 40, has a perpendicular component 38 which gives rise to the recording in the ferrimagnetic medium 10'''. It will be appreciated that because of the very high coercivity of the ferrimagnetic medium at the compensation temperature, high density data capable of being recorded or erased at high speed will be supported by the medium due to the presence of the perpendicular field component 38.

DESCRIPTION OF THE INVENTION

Referring to FIG. 5, a preferred embodiment of the invention in the form of a rotary recording/playback system is illustrated. A substrate in the form of a rigid disk has a deposited layer of ferrimagnetic medium of which one portion 10'''' is shown. The disk 12'''' is driven by a motor 44 and rotates in the direction of the arrow 42. A heating element 28' raises the temperature of the medium 10'''' above the compensation temperature and simultaneously a record head 32' positionable by means of an actuator 46 records the signal froma signal source 34' onto the medium 10''' or erases previously recorded signals from the medium 10''''. As the disk 12'''' rotates away from the heat source 28', the recorded portion of the medium 10'''' cools below the compensation temperature. A conventional magnetoptic reproducing unit 16'', whose laser beam is focussed on the recorded track 35 recovers the signal using techniques known in the art as previously described.

The invention has been described in detail with particular reference to preferred embodiments thereof, but it will be understood that variations and modifications can be effected within the spirit and scope of the invention.

What is claimed is:

1. An improved apparatus to record information for playback by magneto-optic means, said improvement comprising:
   a. a ferrimagnetic medium disposed for parpendicular recording of information thereon, said medium having a compensation temperature,
   b. means for raising the temperature of a portion of said medium to above said compensation temperature,
   c. microgap head means for magnetically recording and re-recording information on said portion of said medium while raised above said compensation temperature without prior unidirectional erasure of said medium,
   d. means for providing relative motion beteen said ferrimagnetic medium and saidmicrogap head means and said magneto-optic means, and
   e. means for cooling said portion of said medium to about said compensation temperature, whereby said information is magnetically replicated in said medium for playback by said magneto-optic means.

2. The apparatus of claim 1 wherein said compensation temperature of said medium is nominal room temperature substantially equal to 293 degrees Kelvin.

3. An improved method of recording or re-recording signal information for playback by magneto-optic means, said method comprising:
   a. heating a portion of a ferrimagnetic medium to a temperature above its compensation temperature,
   b. applying without prior unidirectional erasure of said medium a perpendicular magnetic field to said heated portion of said medium by means of a microgap magnetic record head wherein said magnetic field is related to said signal information,
   c. providing relative motion between said ferrimagnetic medium and said microgap magnetic record head and said magneto-optic means, and
   d. cooling said heated portion of said medium to a temperature substantially equal to said compensation temperature, whereby sid signal information is magnetically stored within said medium for playback by said magneto-optic means.

* * * * *